United States Patent
Li et al.

(10) Patent No.: US 11,160,018 B2
(45) Date of Patent: Oct. 26, 2021

(54) COORDINATED MULTI-ROLE ACCESS-POINT OPERATION

(71) Applicant: Apple Inc., Cupertino, CA (US)

(72) Inventors: Guoqing Li, Cupertino, CA (US); Yong Liu, Campbell, CA (US); Lawrie Kurian, San Jose, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/676,592

(22) Filed: Nov. 7, 2019

(65) Prior Publication Data

US 2020/0154353 A1 May 14, 2020

Related U.S. Application Data

(60) Provisional application No. 62/757,182, filed on Nov. 8, 2018.

(51) Int. Cl.
*H04W 52/02* (2009.01)
*H04W 72/04* (2009.01)
*H04W 84/12* (2009.01)

(52) U.S. Cl.
CPC ... *H04W 52/0206* (2013.01); *H04W 52/0216* (2013.01); *H04W 52/0229* (2013.01); *H04W 72/0406* (2013.01); *H04W 72/0446* (2013.01); *H04W 84/12* (2013.01)

(58) Field of Classification Search
CPC ............ H04W 72/0446; H04W 88/08; H04W 88/085
See application file for complete search history.

(56) References Cited

U.S. PATENT DOCUMENTS

| 7,689,843 B2 * | 3/2010 | Hassan | G06F 1/3203 713/320 |
| 10,912,103 B2 * | 2/2021 | Venkatachalam Jayaraman | H04W 72/121 |
| 2009/0010210 A1 * | 1/2009 | Hiertz | H04W 74/02 370/329 |
| 2013/0010665 A1 * | 1/2013 | Chhabra | H04W 84/18 370/311 |

(Continued)

FOREIGN PATENT DOCUMENTS

| WO | WO 2018143971 A1 | 8/2018 |
| WO | WO 2019125396 A1 | 6/2019 |

*Primary Examiner* — Raj Jain
(74) *Attorney, Agent, or Firm* — Kowert, Hood, Munyon, Rankin & Goetzel, P.C.

(57) ABSTRACT

An electronic device (such as an access point) may provide a management frame, intended for at least a recipient electronic device, that includes slotted-operation information corresponding to a power-save mode of the electronic device for communication with at least the recipient electronic device. The slotted-operation information may include a sequence of temporal slots and associated channel information for the temporal slots. When a channel for a temporal slot comprises a null value, the power-save mode may include transitioning the electronic device into a lower-power-consumption mode during the temporal slot. Alternatively, when a channel for a temporal slot is different than a null value, the power-save mode may include performing another activity than communicating with the recipient electronic device during the temporal slot.

20 Claims, 8 Drawing Sheets

(56) References Cited

U.S. PATENT DOCUMENTS

| | | | |
|---|---|---|---|
| 2014/0295883 A1* | 10/2014 | Kang | H04W 64/00 455/456.1 |
| 2015/0296434 A1* | 10/2015 | Batchu | H04W 52/0251 370/331 |
| 2015/0381425 A1* | 12/2015 | Kansal | H04L 41/0896 709/224 |
| 2018/0295573 A1 | 10/2018 | Gidvani | |
| 2020/0154353 A1* | 5/2020 | Li | H04W 72/0446 |

* cited by examiner

COORDINATED MULTI-ROLE ACCESS-POINT OPERATION

CROSS-REFERENCE TO RELATED APPLICATION

This application claims the benefit of U.S. Provisional Application No. 62/757,182, entitled "Coordinated Multi-Role Access-Point Operation," by Guoqing Li, et al., filed Nov. 8, 2018, the contents of which are hereby incorporated by reference.

FIELD

The described embodiments relate, generally, to wireless communications among electronic devices, and techniques for communicating operating information for a multi-role access points using temporal slots, and/or for communicating information that specifies a power-save mode for an access point.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). Historically, access points have always been powered on or been in a higher-power-consumption mode. Therefore, in initial IEEE 802.11 standards, access points are typically assumed to always be available for communication with a recipient electronic device. Consequently, there is no power-save mode for an access point defined in these standards.

Because of a need for backwards compatibility with legacy electronic devices, subsequent IEEE 802.11 protocol amendments (e.g., IEEE 802.11a, IEEE 802.11b, IEEE 802.11g, IEEE 802.11d, IEEE 802.11ac, and IEEE 802.11ax) have also typically assumed that access points are always available to communicate with a recipient electronic device and, thus, that access points usually stay active all the time. However, this same reasoning applies for future IEEE 802.11 standards, which may make it difficult to incorporate a power-saving mode so that an access point does not have to stay active all the time.

SUMMARY

A first group of embodiments relates to an electronic device that provides a management frame. This electronic device may include a node that can be communicatively coupled to an antenna, and an interface circuit communicatively coupled to the node and that communicates with at least a recipient electronic device. During operation, the interface circuit provides, to the node, the management frame, intended for at least the recipient electronic device, that includes slotted-operation information corresponding to a power-save mode of the electronic device for communication with at least the recipient electronic device. The slotted-operation information includes a sequence of temporal slots and associated channel information for the temporal slots.

Note that the sequence of temporal slots may include multiple temporal slots and may have a slot period.

Moreover, the management frame may include a duration of the temporal slots.

Furthermore, the channel information may include operating classes and channels in the operating classes. For example, when a channel for a temporal slot includes a null value, the power-save mode may include transitioning the electronic device into a lower-power-consumption mode during the temporal slot. Alternatively, when a channel for a temporal slot is different than a null value, the power-save mode may include performing another activity than communicating with the recipient electronic device during the temporal slot.

Additionally, the management frame may include: a beacon, a probe-response frame, and/or an association-response frame.

In some embodiments, the management frame specifies a number of beacon intervals or a time duration over which the sequence of temporal slots and the associated channel information is valid.

Note that the management frame may be associated with a band of frequencies, and the management frame may include slotted-operation information for the band of frequencies and a second band of frequencies.

Moreover, the management frame may include synchronization information associated with the electronic device and a synchronization rank of the electronic device.

Furthermore, the slotted-operation information for temporal slots associated with the recipient electronic device may be different in different bands of frequencies.

Additionally, the interface circuit may receive, at the node, recommended slotted-operation information associated with the recipient electronic device. The recommended slotted-operation information may include at least one of: a recommended sequence of temporal slots for the recipient electronic device, or recommended channel information for one or more temporal slots for the recipient electronic device. Moreover, the slotted-operation information may be based at least in part on the recommended slotted-operation information.

In some embodiments, the management frame is compatible with an IEEE 802.11 communication protocol.

Note that the access point may include: an infrastructure access point, or a software access point.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a management frame. The method includes at least some of the aforementioned operations performed by the interface circuit in the electronic device.

Other embodiments provide a recipient electronic device that receives a management frame. This recipient electronic device may include a node that can be communicatively coupled to an antenna, and a second interface circuit communicatively coupled to the node and that communicates with at least an electronic device. During operation, the second interface circuit receives, from the node, the management frame, associated with the electronic device, that includes slotted-operation information corresponding to a power-save mode of the electronic device for communication with at least the recipient electronic device. The slotted-operation information may include a sequence of temporal slots and associated channel information for the temporal slots.

Moreover, the second interface circuit may provide, from the node, recommended slotted-operation information intended for the electronic device, where the recommended slotted-operation information may include at least one of: a recommended sequence of temporal slots for the recipient electronic device, or recommended channel information for one or more temporal slots for the recipient electronic device. Furthermore, the slotted-operation information may be based at least in part on the recommended slotted-operation information.

Other embodiments provide a second interface circuit in the recipient electronic device.

Other embodiments provide a computer-readable storage medium for use with the second interface circuit in the recipient electronic device. When program instructions stored in the computer-readable storage medium are executed by the second interface circuit, the program instructions may cause the recipient electronic device to perform at least some of the aforementioned operations of the recipient electronic device.

Other embodiments provide a method for receiving a management frame. The method includes at least some of the aforementioned operations performed by the second interface circuit in the recipient electronic device.

A second group of embodiments relates to an electronic device that provides a schedule of a power-save mode. This electronic device may include a node that can be communicatively coupled to an antenna, and an interface circuit communicatively coupled to the node and that communicates with at least a recipient electronic device. During operation, the interface circuit provides, to the node, information, intended for at least the recipient electronic device, that specifies the schedule of the power-save mode of the electronic device for communication with at least the recipient electronic device, where the power-save mode is compatible with an IEEE 802.11 communication protocol.

Note that the power-save mode may be associated with a 6 GHz band of frequencies.

Moreover, the power-save mode may be quasi or semi-static and may be valid for multiple time intervals. Alternatively, the power-save mode may be dynamic and may be valid for one time interval.

Furthermore, the information may specify a power-save-mode capability of the electronic device.

Additionally, the information may be conveyed using unicast communication, and the power-save mode may be associated with the recipient electronic device.

In some embodiments, the information may be conveyed using broadcast communication, the power-save mode may be associated with a group of recipient electronic devices that includes the recipient electronic device, the schedule may be common to the group of recipient electronic devices.

Note that the power-save mode may be different for different recipient electronic devices.

Moreover, during the power-save mode, the electronic device may perform an activity other than communication with the recipient electronic device. For example, the activity may include: transition to a lower-power-consumption mode, perform an off-channel scan, and/or switch to a different channel to engage in another activity.

Furthermore, the schedule may include a start of the power-save mode and a duration of the power-save mode.

Additionally, the schedule may include an availability schedule of the electronic device. For example, the schedule may include a start of an availability interval and a duration of the availability interval.

In some embodiments, the information may include a persistency value that specifies a number of time intervals during which the schedule is valid.

Moreover, the information may be conveyed in: a beacon, and/or a power-save set-up frame.

Furthermore, the information may include mode information that indicates whether the electronic device expects a response from the recipient electronic device.

Additionally, the information may be based at least in part on capabilities of the electronic device and the recipient electronic device.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a schedule or a power-save mode. The method includes at least some of the aforementioned operations performed by the interface circuit in the electronic device.

Other embodiments provide a recipient electronic device that receives a schedule of a power-save mode. This recipient electronic device may include a node that can be communicatively coupled to an antenna, and a second interface circuit communicatively coupled to the node and that communicates with at least an electronic device. During operation, the second interface circuit receives, from the node, information, associated with the electronic device, that specifies a schedule of a power-save mode of the electronic device for communication with at least the recipient electronic device, where the power-save mode is compatible with an IEEE 802.11 communication protocol.

Moreover, the second interface circuit may cease communication with the electronic device during power-save temporal slots.

Furthermore, the second interface circuit may provide, to the node, information, intended for the electronic device, that specifies a power-save-mode capability of the recipient electronic device.

Additionally, the second interface circuit may: receive, at the node, a request associated with the electronic device for power-save-capability information of the recipient electronic device; and provide, to the node, a response to the request intended for the electronic device, which indicates the power-save-mode capability of the recipient electronic device. Note that the information may be based at least in part on the power-save-mode capability of the recipient electronic device. For example, the response may include recommendation information that specifies a recommended schedule of the power-save mode of the electronic device, and the recommendation information may include mode information that indicates that the recipient electronic device is responding to the request from the electronic device.

Other embodiments provide a second interface circuit in the recipient electronic device.

Other embodiments provide a computer-readable storage medium for use with the second interface circuit in the recipient electronic device. When program instructions stored in the computer-readable storage medium are executed by the second interface circuit, the program instructions may cause the recipient electronic device to perform at least some of the aforementioned operations of the recipient electronic device.

Other embodiments provide a method for receiving a schedule of a power-save mode. The method includes at least some of the aforementioned operations performed by the second interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
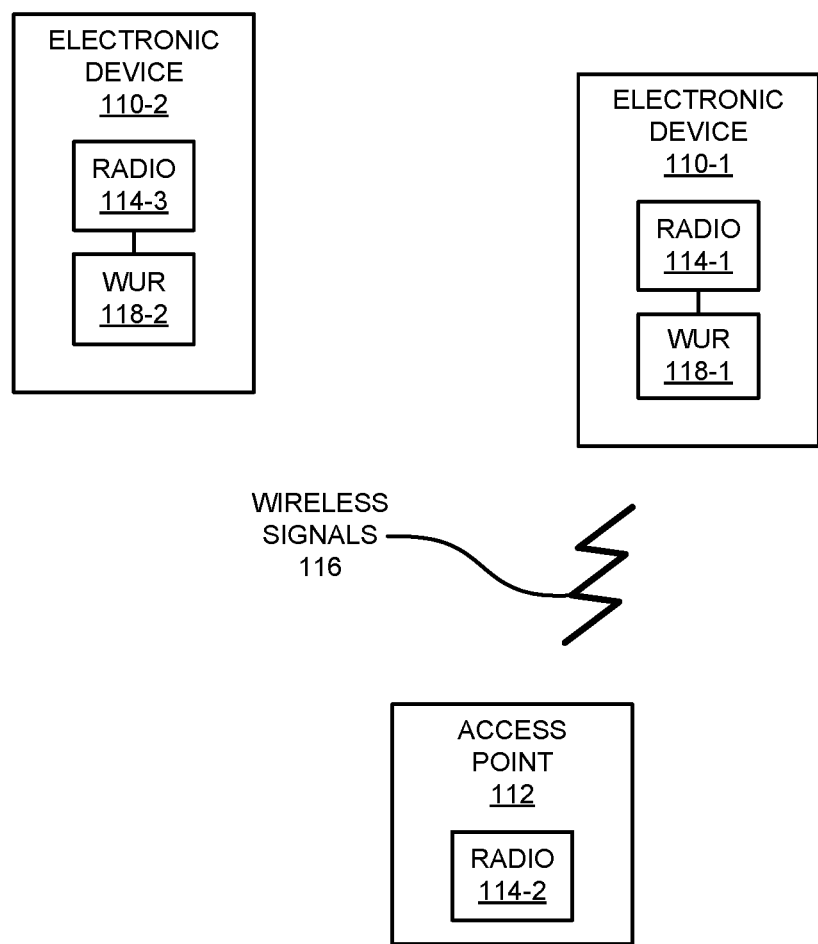
FIG. 1 is a block diagram illustrating an example of electronic devices communicating wirelessly.

In a first group of embodiments, an electronic device (such as an access point) may provide a management frame, intended for at least a recipient electronic device, that includes slotted-operation information corresponding to a power-save mode of the electronic device for communication with at least the recipient electronic device. The slotted-operation information may include a sequence of temporal slots and associated channel information for the temporal slots. When a channel for a temporal slot comprises a null value, the power-save mode may include transitioning the electronic device into a lower-power-consumption mode during the temporal slot. Alternatively, when a channel for a temporal slot is different than a null value, the power-save mode may include performing another activity than communicating with the recipient electronic device during the temporal slot.

By providing the slotted-operation information, these communication techniques may facilitate selective transitioning into the lower-power consumption mode based at least in part on the sequence of temporal slots and the associated channel information for the temporal slots. Moreover, the communication techniques may provide additional operational degrees of freedom for the electronic device. Consequently, the communication techniques may facilitate reduced power consumption by the electronic device and/or improved communication performance. Therefore, the communication techniques may improve the user experience when using the electronic device or the recipient electronic device, and therefore may increase customer satisfaction and retention.

In a second group of embodiments, an electronic device (such as an access point) may provide a beacon or a power-save set-up frame, intended for at least the recipient electronic device, with information that specifies a schedule of a power-save mode of the electronic device for communication with at least the recipient electronic device, where the power-save mode is compatible with an IEEE 802.11 communication protocol. Therefore, the schedule may include an availability schedule of the electronic device. For example, the schedule may include a start of an availability interval and a duration of the availability interval. Moreover, during the power-save mode, the electronic device may perform an activity other than communication with the recipient electronic device. For example, the activity may include: transition to a lower-power-consumption mode, perform an off-channel scan, and/or switch to a different channel to engage in another activity.

By providing the information, these communication techniques may facilitate selective transitioning into the lower-power consumption mode based at least in part on the schedule. Moreover, the communication techniques may allow the electronic device to perform other activities during the times when the electronic device is unavailable for communication with at least the recipient electronic device. More generally, the communication techniques may provide additional operational degrees of freedom. Consequently, the communication techniques may facilitate reduced power consumption by the electronic device and/or improved communication performance. Therefore, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 12, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4 and 7-9, radio 114-1 may receive wireless signals 116 that are transmitted by radio 114-2. Alternatively, radio 114-1 may transmit wireless signals 116 that are received by radio 114-2.

Note that radio 114-1 may consume additional power in a higher-power mode. If radio 114-1 remains in the higher-power mode even when it is not transmitting or receiving packets, the power consumption of electronic device 110-1 may be needlessly increased. Consequently, electronic devices 110 may include optional wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, existing access points do not have a power-save mode. In order to address this problem, as described below with reference to FIGS. 2-6, in some embodiments of the disclosed communication techniques, access point 112 may provide a management frame to at least one of electronic devices 110 (such as electronic device 110-1). This management frame may include slotted-operation information corresponding to a power-save mode of access point 112 for communication with at least electronic device 110-1. The slotted-operation information may include a sequence of temporal slots and associated channel information for the temporal slots. When a channel for a temporal slot comprises a null value, the power-save mode may include transitioning access point 112 into a lower-power-consumption mode during the temporal slot. Alternatively, when a channel for a temporal slot is different than a null value, the power-save mode may include performing another activity than communicating with electronic device 110-1 during the temporal slot. For example, access point 112 may transition to a lower-power-consumption mode, perform an off-channel scan, and/or switch to a different channel to engage in another activity.

Alternatively or additionally, as described further below with reference to FIGS. 7-11, in some embodiments of the disclosed communication techniques, access point 112 may provide a beacon or a power-save set-up frame to at least one of electronic devices 110 (such as electronic device 110-1). The beacon or the power-save set-up frame may include information that specifies a schedule of a power-save mode of access point 112 for communication with at least electronic device 110-1, where the power-save mode is compatible with an IEEE 802.11 communication protocol. Therefore, the schedule may include an availability schedule of access point 112. For example, the schedule may include a start of an availability interval and a duration of the availability interval. Moreover, during the power-save mode, access point 112 may perform an activity other than communication with electronic device 110-1. For example, the activity may include: transition to a lower-power-consumption mode, perform an off-channel scan, and/or switch to a different channel to engage in another activity.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use MU transmission (OFDMA). For example, radio 114-2 may provide a trigger frame for the one or more electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments one or more of electronic devices 110 may individually provide acknowledgments to radio 114-2. Thus, radio 114-1 (and, more generally, radios 114 in the electronic devices 110-1 and/or 110-2) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
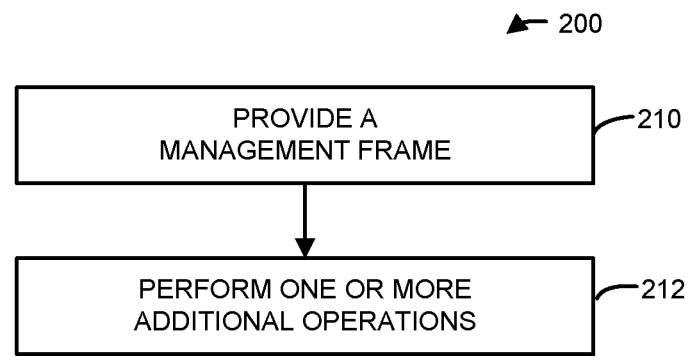
FIG. 2 is a flow diagram illustrating an example method for providing a management frame using one of the electronic devices in FIG. 1.

We now further describe the first group of embodiments. FIG. 2 presents a flow diagram illustrating an example method 200 for providing a management frame. This method may be performed by an electronic device, such as access point 112 in FIG. 1. Note that the communication with the recipient electronic device may be compatible with an IEEE 802.11 communication protocol.

During operation, the electronic device may provide the management frame (operation 210) to at least a recipient electronic device. The management frame may include slotted-operation information corresponding to a power-save mode of the electronic device for communication with at least the recipient electronic device. Moreover, the slotted-operation information may include a sequence of temporal slots and associated channel information for the temporal slots.

Note that the sequence of temporal slots may include multiple temporal slots and may have a slot period. Moreover, the management frame may include a duration of the temporal slots. Furthermore, the slotted-operation information for temporal slots associated with the recipient electronic device may be different in different bands of frequencies.

Furthermore, the channel information may include operating classes and channels in the operating classes. For example, when a channel for a temporal slot includes a null value, the power-save mode may include transitioning the electronic device into a lower-power-consumption mode during the temporal slot. Alternatively, when a channel for a temporal slot is different than a null value, the power-save mode may include performing another activity than communicating with the recipient electronic device during the temporal slot.

Note that the management frame may be associated with a band of frequencies, and the management frame may include slotted-operation information for the band of frequencies and a second band of frequencies. Moreover, the management frame may include synchronization information associated with the electronic device and a synchronization rank of the electronic device. Furthermore, the management frame may include: a beacon, a probe-response frame, and/or an association-response frame. In some embodiments, the management frame specifies a number of beacon intervals or a time duration over which the sequence of temporal slots and the associated channel information is valid.

Note that the management frame may be compatible with an IEEE 802.11 communication protocol.

Moreover, the access point may include: an infrastructure access point, or a software access point.

In some embodiments, the electronic device may optionally perform one or more additional operations (operation 212). For example, the electronic device may receive recommended slotted-operation information associated with the recipient electronic device. The recommended slotted-operation information may include at least one of: a recommended sequence of temporal slots for the recipient electronic device, or recommended channel information for one or more temporal slots for the recipient electronic device. Moreover, the slotted-operation information may be based at least in part on the recommended slotted-operation information.

Figure 3:
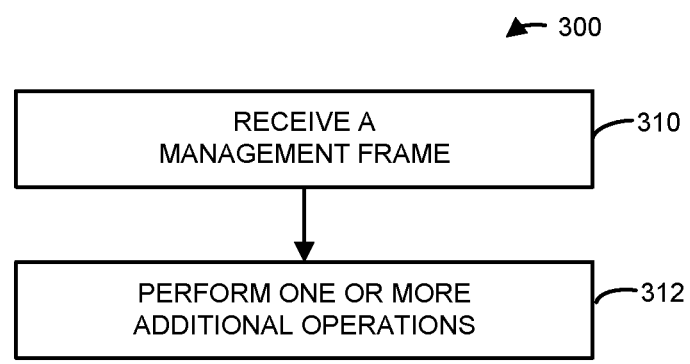
FIG. 3 is a flow diagram illustrating an example method for receiving a management frame using one of the electronic devices in FIG. 1.

FIG. 3 presents a flow diagram illustrating an example method 300 for receiving a management frame. This method may be performed by a recipient electronic device, such as electronic device 110-1 in FIG. 1. Note that the communication with the electronic device may be compatible with an IEEE 802.11 communication protocol.

During operation, the recipient electronic device may receive a management frame (operation 310) from an electronic device. The management frame may include slotted-operation information corresponding to a power-save mode of the electronic device for communication with at least the recipient electronic device. Moreover, the slotted-operation information may include a sequence of temporal slots and associated channel information for the temporal slots.

In some embodiments, the recipient electronic device may optionally perform one or more additional operations (operation 312). For example, the recipient electronic device may provide recommended slotted-operation information intended for the electronic device, where the recommended slotted-operation information may include at least one of: a recommended sequence of temporal slots for the recipient electronic device, or recommended channel information for one or more temporal slots for the recipient electronic device. Furthermore, the slotted-operation information may be based at least in part on the recommended slotted-operation information.

Figure 4:
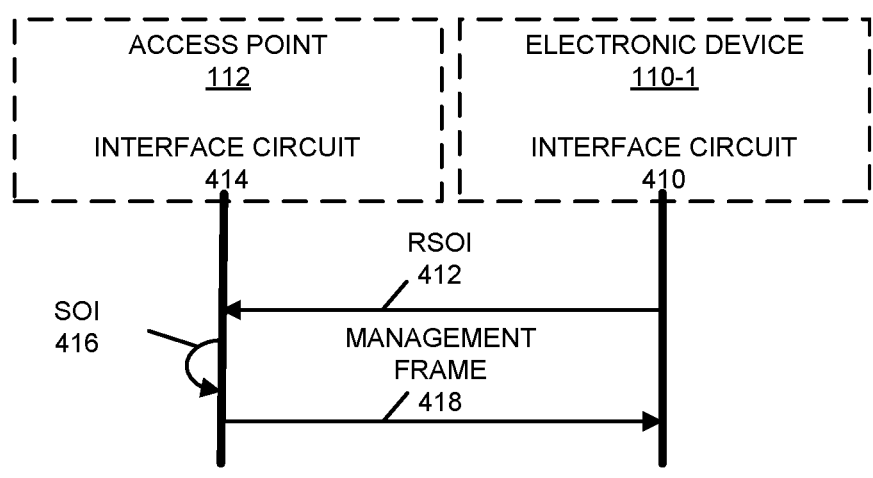
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. An interface circuit 410 in electronic device 110-1 may provide recommended slotted-operation information (RSOI) 412 associated with electronic device 110-1 to access point 112. After receiving the recommended slotted-operation information 412, an interface circuit 414 in access point 112 may determine slotted-operation information (SOI) 416 corresponding to a power-save mode of access point 112 for communication with at least electronic device 110-1. Note that the slotted-operation information 416 may include a sequence of temporal slots and associated channel information for the temporal slots.

Then, interface circuit 414 may provide, to electronic device 110-1, a management frame 418 with the slotted-operation information 416.

As noted previously, existing IEEE 802.11 standards do not include a power-save mode. Consequently, an access point typically remains in a power on state.

In order to address this challenge, an electronic device (such as an access point) may have an explicit power-save mode. This capability may allow an access point that is power limited or constrained (such as a 'mobile', a 'virtual' or a 'software' access point that is implemented on a computer or an electronic device) to save power and, more generally, to have additional operational degrees of freedom.

Notably, when an access point goes into a power-save mode, an associated recipient electronic device (which is sometimes referred to as a 'station' or a 'client') usually has to stop transmitting to the access point. This typically increases latency and reduces throughput to applications on the recipient electronic device.

However, instead of going to sleep or a lower-power-consumption mode, the access point may use the power-save mode to operate in or perform other activities (such as peer-to-peer or P2P, or performing a roaming scan), even though the access point may claim that it is in the lower-power-consumption mode to its associated recipient electronic devices. Note that, when the access point is engaged in other activities (such in a neighborhood area network or NAN), it is possible that the access point is operating on a different channel from its own basic service set (BSS) channel. Thus, even when the access point is operating in a NAN mode, it may still be awake and may be time sharing the radio of the access point (e.g., using time domain multiple access) between the power-save mode (while performing NAN activities) and infrastructure mode with its associated recipient electronic devices. This approach may be inefficient. In a more efficient approach, the access point may use every channel for each type of traffic (P2P, infrastructure, software access point, etc.).

For example, an electronic device may serve multiple roles using the same radio, including: as a NAN device communicating with a NAN peer; and/or as a software access point serving with its client recipient electronic device. Moreover, in this example, it is possible that the software access points and its recipient electronic devices may have a lot of traffic to exchange. However, when a NAN slot starts, the software access point may have to switch to a NAN slot, even though there may not be a lot of NAN traffic in the NAN slot. Consequently, the NAN slot may be under-utilized, while the infrastructure data for the software access point may be buffered.

In another example, an electronic device may use the same radio to serve: a mesh access point and to communicate with one or more other mesh access points; and/or an infrastructure access point or a software access point that is communicating with its associated recipient electronic devices. Note that the channel used between mesh access points may be different from the channels used by the infrastructure access point and the associated recipient electronic devices.

Furthermore, in this example there may be much more traffic between the mesh access points than that between the infrastructure access point and its recipient electronic devices. Consequently, the infrastructure mode may be under-utilized, while the data for the software access point may be buffered.

Figure 5:
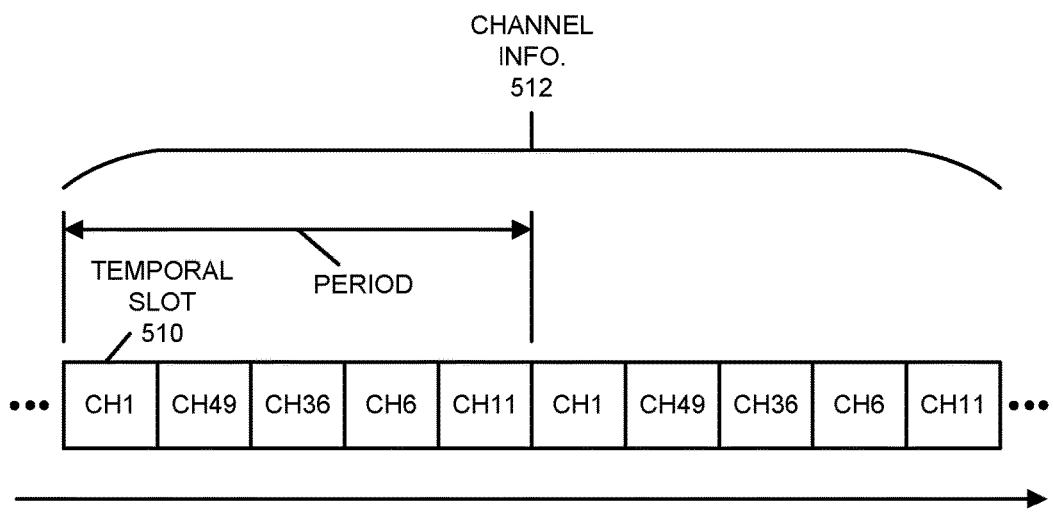
FIG. 5 is a drawing illustrating an example of a sequence of temporal slots with associated channel information for the temporal slots.

In the communication techniques, an access point may be allowed to advertise slotted operation and to advertise the operating channels of the different temporal slots. Note that the advertisement may include information, including: a power-save slot duration and periodicity; and/or a channel sequence (such as the operating channel for each slot). Note that the operating channel information may include an operating class and a channel number in the operating class. Moreover, a channel for a particular slot can be indicated as 'none' or 'null', which may mean that the access point is not available on this particular slot, e.g., the access point may go or transition into a power-save mode in this particular slot. In some embodiments, the information is advertised in: a beacon, a probe-response frame, and/or an association-response frame. FIG. 5 presents a drawing illustrating an example of a sequence of temporal slots (such as temporal slot 510) with associated channel information 512 for the temporal slots. This repeating channel sequence may be used by access point 112 for slotted operation.

Moreover, when there are changes in the channel sequence, an access point may advertise additional information, such as a value indicating the number of a beacon interval for which a current channel sequence is still valid. For example, the additional information may be conveyed in an information element in a payload of a frame. Alternatively or additionally, an access point may advertise of the slotted channel sequence information for different bands. For example, a radio may advertise the slotted operation information and the associated channel sequence for a 6 GHz frequency band in a 2.4 GHz frequency band. Consequently, a recipient electronic device that is dual band (such as 2.4 GHz and 6 GHz) may be able to discover such information from either of the bands. In general, an access point may advertise the slotted channel sequence information for one or more frequency bands in a given frequency band.

Furthermore, access points may advertise their clock and a rank number to each other in order to synchronize the clocks among access points. Note that synchronizing the access points may allow two NAN peer recipient electronic devices that are associated with different access points to be able to synchronize at slot boundaries, thereby avoiding overlapping slots. Moreover, an access point that received clock information from a higher ranked access point may adopt the clock information for the other access point, i.e., it may follow the clock from the higher ranked access point. However, in some embodiments, an access point that received clock information from a lower ranked access point may adopt the clock information for the other access point, i.e., it may follow the clock from the lower ranked access point.

In some embodiments, a recipient electronic device may operate in different modes in different channels. In order to maximize the communication time between the recipient electronic device and the access points, the recipient electronic device may suggest a particular channel sequence or a particular channel for a particular slot for the associated access point.

Figure 6:
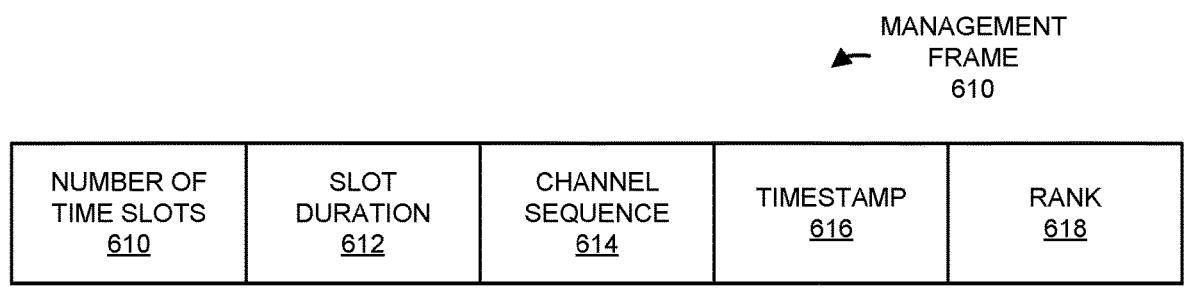
FIG. 6 is a drawing illustrating an example of a management frame.

An example of the signaling format for these embodiments is shown in FIG. 6, which presents a drawing illustrating an example of a management frame 610. Notably, the information advertised by an access point in management frame 610 may include: a number of time slots 612 in each period, a slot duration 614, a channel sequence 616 and associated frequency bands (which may be interleaved or separate from the channels), a timestamp 618 and/or a rank 620. Alternatively or additionally, the information advertised by a recipient electronic device may include: a number of time slots in each period, a slot duration, a channel sequence and/or associated frequency bands (which may be interleaved or separate from the channels). Note that the information advertised by a recipient electronic device may involve unicast communication.

Figure 7:
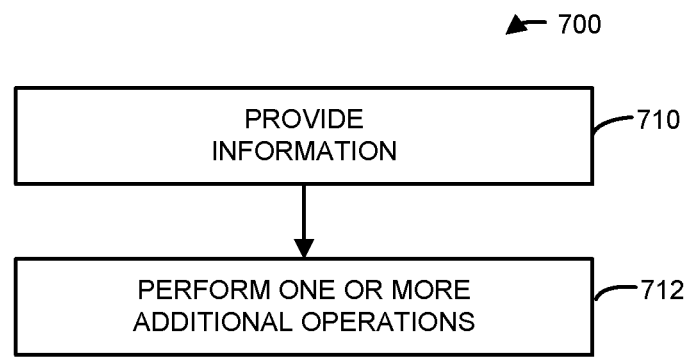
FIG. 7 is a flow diagram illustrating an example method for providing a schedule of a power-save mode using one of the electronic devices in FIG. 1.

We now further describe the second group of embodiments. FIG. 7 presents a flow diagram illustrating an example method 500 for providing a schedule of a power-save mode. This method may be performed by an electronic device, such as access point 112 in FIG. 1. Note that the communication with the recipient electronic device may be compatible with an IEEE 802.11 communication protocol.

During operation, the electronic device may provide information (operation 710) to at least a recipient electronic device. This information may specify the schedule of the power-save mode of the electronic device for communication with at least the recipient electronic device, where the power-save mode is compatible with an IEEE 802.11 communication protocol.

Note that the power-save mode may be associated with a 6 GHz band of frequencies. Moreover, the power-save mode may be quasi or semi-static and may be valid for multiple time intervals. Alternatively, the power-save mode may be dynamic and may be valid for one time interval. Furthermore, the information may specify a power-save-mode capability of the electronic device. Additionally, the information may be conveyed using unicast communication, and the power-save mode may be associated with the recipient electronic device. In some embodiments, the information may be conveyed using broadcast communication, the power-save mode may be associated with a group of recipient electronic devices that includes the recipient electronic device, the schedule may be common to the group of recipient electronic devices.

Moreover, the power-save mode may be different for different recipient electronic devices. Furthermore, the schedule may include a start of the power-save mode and a duration of the power-save mode. Additionally, the schedule may include an availability schedule of the electronic device. For example, the schedule may include a start of an availability interval and a duration of the availability interval. In some embodiments, the information may include a persistency value that specifies a number of time intervals during which the schedule is valid.

Moreover, the information may be conveyed in: a beacon, and/or a power-save set-up frame. Furthermore, the information may include mode information that indicates whether the electronic device expects a response from the recipient electronic device. Additionally, the information may be based at least in part on capabilities of the electronic device and the recipient electronic device.

In some embodiments, the electronic device may optionally perform one or more additional operations (operation 712). For example, during the power-save mode, the electronic device may perform an activity other than communication with the recipient electronic device. This activity may include: transition to a lower-power-consumption mode, perform an off-channel scan, and/or switch to a different channel to engage in another activity.

Figure 8:
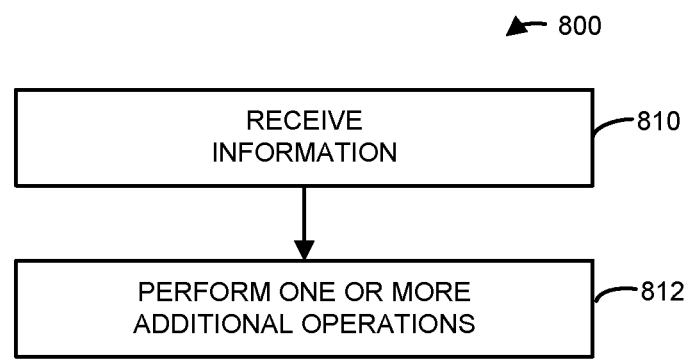
FIG. 8 is a flow diagram illustrating an example method for receiving a schedule of a power-save mode using one of the electronic devices in FIG. 1.

FIG. 8 presents a flow diagram illustrating an example method 800 for receiving a schedule of a power-save mode. This method may be performed by a recipient electronic device, such as electronic device 110-1 in FIG. 1. Note that the communication with the electronic device may be compatible with an IEEE 802.11 communication protocol.

During operation, the recipient electronic device may receive information (operation 810) from an electronic device. This information may specify a schedule of a power-save mode of the electronic device for communication with at least the recipient electronic device, where the power-save mode is compatible with an IEEE 802.11 communication protocol.

In some embodiments, the recipient electronic device may optionally perform one or more additional operations (operation 812). For example, the recipient electronic device may cease communication with the electronic device during power-save temporal slots. Moreover, the recipient electronic device may provide information to the electronic device, that specifies a power-save-mode capability of the recipient electronic device. Furthermore, the recipient electronic device may: receive a request from the electronic device for power-save-capability information of the recipient electronic device; and provide a response to the request to the electronic device, which indicates the power-save-mode capability of the recipient electronic device. Note that the information may be based at least in part on the power-save-mode capability of the recipient electronic device. For example, the response may include recommendation information that specifies a recommended schedule of the power-save mode of the electronic device, and the recommendation information may include mode information that indicates that the recipient electronic device is responding to the request from the electronic device.

In some embodiments of methods 200 (FIG. 2), 300 (FIG. 3), 700 (FIG. 7) and/or 800, there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2), 300 (FIG. 3), 700 (FIG. 7) and/or 800 are, at least in part, performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

Figure 9:
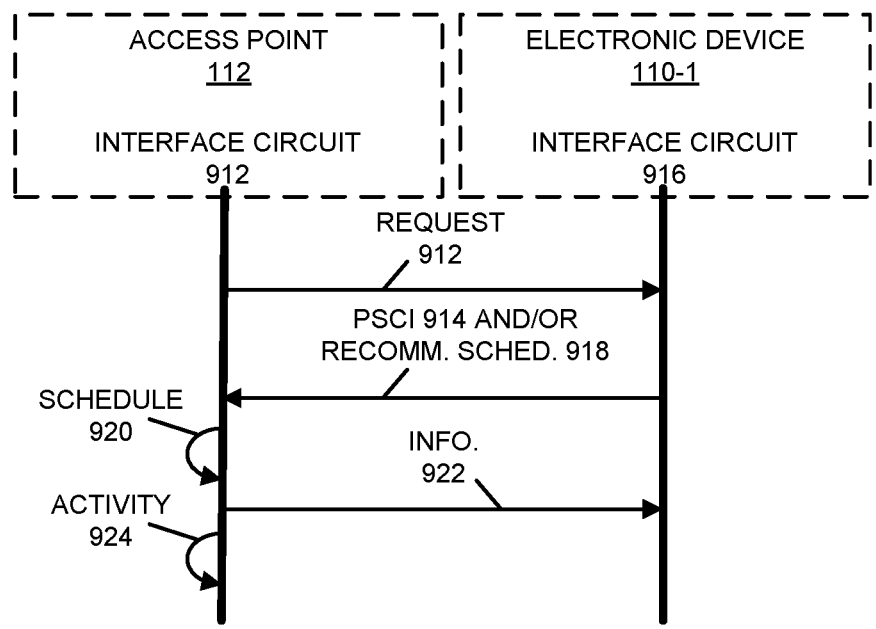
FIG. 9 is a flow diagram illustrating an example of communication between electronic devices, such as the electronic devices of FIG. 1.

The communication techniques are further illustrated in FIG. 9, which presents a flow diagram illustrating an example of communication between electronic device 110-1 and access point 112. An interface circuit 910 in access point 112 may provide a request 912 to electronic device 110-1 for power-save-capability information (PSCI) 914 of electronic device 110-1.

After received request 912, interface circuit 916 in electronic device may provide, to access point 112, the power-save-capability information 914 and/or a recommended schedule 918 of a power-save mode of access point 112 for communication with at least electronic device 110-1. Then, interface circuit 916 may determine schedule 920 of the power-save mode based at least in part on the power-save-capability information 914 and/or recommended schedule 918. Next, interface circuit 916 may provide information 922 (such as one or more packets or frames) that specifies schedule 920. This information may be received by interface circuit 910 in electronic device 110-1.

Then during the power-save mode, interface circuit 916 may perform an activity 924 other than communication with electronic device 110-1. This activity may include: transition to a lower-power-consumption mode, perform an off-channel scan, and/or switch to a different channel to engage in another activity.

While FIGS. 4 and 9 are illustrated with single-side arrows corresponding to unidirectional communication among components in and between access point 112 and electronic device 110-1, more generally operations during communication among components in and between access point 112 and electronic device 110-1 may involve unidirectional and/or bidirectional communication.

As noted previously, existing IEEE 802.11 standards do not include a power-save mode. A new 6 GHz frequency band may provide an opportunity to define an access point power-save mode. Notably, the IEEE has recently formed a new study group called Extreme High Throughput (EHT) to define a next generation IEEE 802.11 protocol after IEEE 802.11ax. One of the scopes for EHT is Wi-Fi improvement on the new unlicensed 6 GHz frequency band to be released by regulatory bodies. In this new frequency band, there is the freedom to define new requirements that need not be backward compatible with legacy standards. Therefore, this is an opportunity to define an access-point power-save mode for EHT-capable access points in the 6 GHz frequency band.

The communication techniques may provide an explicit access-point power-save mode. Notably, there may be two or more types of access-point power-save modes, including: a semi-static access-point power-save mode in which the access point can advertise a semi-static power-save schedule or, equivalently, an awake schedule; and/or a dynamic access-point power-save mode in which an access point can advertise a period of awake or sleep time at any time. Note that the capability of supporting an access-point power-save mode may be advertised by access point and/or a recipient electronic device. For example, the advertisement may indicate whether or not: an access point supports a semi-static access-point power-save mode; an access point supports a dynamic access-point power-save mode; a recipient electronic device supports a semi-static access-point power-save mode; and/or a recipient electronic device supports a dynamic access-point power-save mode.

Moreover, during power-save temporal slots of an access point, a recipient electronic device may not transmit to an access point. Furthermore, an access point may use these power-save slot to save power (such as by transitioning to a lower-power-consumption mode) or for other purposes or activities. For example, the power-save slots may be used to: transition to the lower-power-consumption mode to save power; go off channel to perform a scan; and/or switch to different channels to engage in different activities.

In some embodiments, an access-point power-save mode may be based at least in part on access-point power-save schedule persistency. Notably, in order for an access point to go into a power-save mode on a channel during a slot, an associated recipient electronic device may first need to be informed of information, such as: a start of a power-save time for the access point, and a power-save duration of the access point. Alternatively, recipient electronic device may first need to be informed of information, such as: a start of an available time for the access point, and an availability duration of the access point. Based at least in part on persistency of the access-point power-save schedule, there may be two or more types of access-point power-save modes: a semi-static access-point power-save mode in which access-point power-save scheduled information is valid for more than one time interval or period; and/or a dynamic access-point power-save mode in which the access-point power-save parameters are only valid once (e.g., for one time interval or period, such as a beacon period).

Furthermore, the communication of information about the access-point power-save modes may be unicast or broadcast. Notably, for an individual access-point power-save schedule, an access point and a recipient electronic device may set up the individual access-point power-save schedule using unicast management frames. In these embodiments, the power-save schedule of an access point may be different for different recipient electronic devices. Alternatively, for a broadcast or multicast access-point power-save schedule, an access point may set up the broadcast access-point power-save schedule for some or all associated recipient electronic devices in a wireless local area network using a beacon, a probe-response frame and/or an association-response frame. In these embodiments, the access-point power-save schedule may be the same for some or all of the recipient electronic devices in a wireless local area network.

Figure 10:
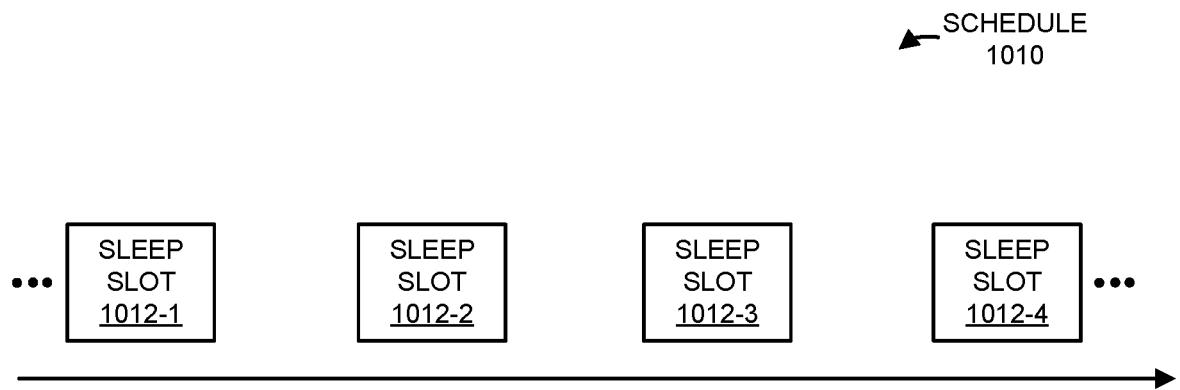
FIG. 10 is a drawing illustrating an example of a schedule of a power-save mode of one of the electronic devices in FIG. 1.

Additionally, access-point power-save signaling may use an access-point power-save information element and/or an access-point power-save set-up frame. The access-point power-save information element may include: a power-save sleep schedule of an access point; a timing synchronization function (TSF) of the next sleep start time of the access point; an interval of the sleep slot of the access point if the power-save mode is semi-static; a power-save slot duration; and/or a persistency value of the access-point power-save schedule that indicates how long the access-point power-save schedule is valid. FIG. 10 presents a drawing illustrating an example of a schedule 1010 of a power-save mode of access point 112 (FIG. 1), which may include sleep slots 1012.

Note that the persistency value may indicate for how many beacon intervals the access-point power-save schedule remains the same or it may indicate a duration during which the access-point power-save schedule remains the same. If the persistency value equals, e.g., '0', it may mean that the access-point power-save schedule is set up without persistency, i.e., a dynamic power-save schedule. Alternatively, if the persistency value is, e.g., greater than '0', it may mean that the access-point power-save schedule is set up for a semi-static power-save schedule.

Figure 11:
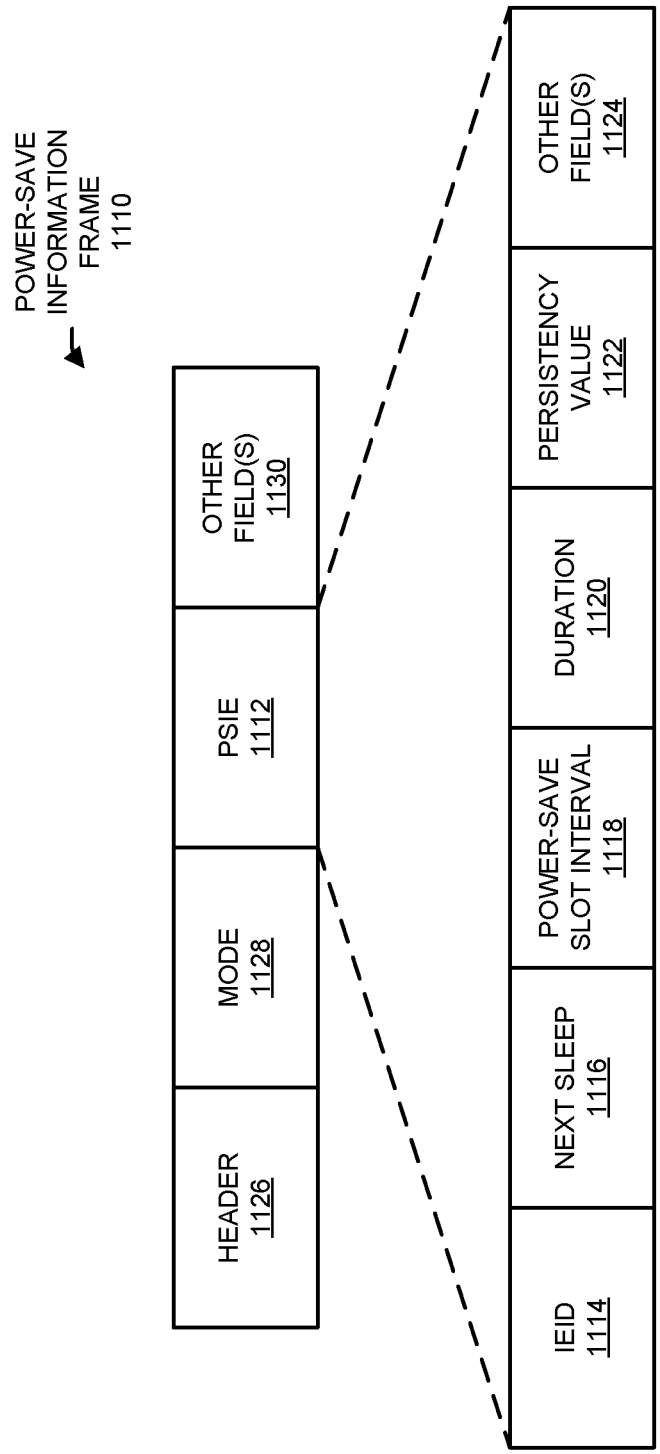
FIG. 11 is a drawing illustrating an example of a power-save information frame with a power-save information element.

FIG. 11 presents a drawing illustrating an example of a power-save information frame 1110 with a power-save information element (PSIE) 1112. Notably, power-save information element 1112 can be contained or included in a beacon and may include: an information element identifier (IEID) 1114, a next sleep TSF 1116, an access-point power-save slot interval 1118, a duration 1120 of each access-point power-save slot, a persistency value 1122, and/or other fields 1124. Note that, when contained in a beacon, the persistency value 1122 may indicate that access-point power-save schedule is the same for a particular number of beacon intervals. For example, when the persistency value 1122 is '4', it may mean the access-point power-save schedule is valid for the next four beacon intervals. Alternatively, if persistency value 1122 is, e.g., '0', it may mean that the access-point power-save schedule is only valid for the current beacon interval.

Moreover, as shown in FIG. 11, the power-save information element 1112 may be included in a power-save information frame 1110, such as an access-point power-save set-up frame. The access-point power-save set-up frame may include: a header 1126, a mode 1128, a power-save information element 1112 and/or other fields 1130. Moreover, the access-point power-save may be communicated using a unicast transmission and, thus, may be used to set up or negotiate an individual access-point power-save schedule for an individual recipient electronic device. Note that the mode 1128 field may indicate whether this access point is sending access-point power-save requests or access-point power-save advertisements, or whether the access-point power-save set-up frame is sent by a recipient electronic device responding to a request from an access point.

For example, the mode 1128 value in an access-point power-save set-up frame may include, e.g., a value of: '0' to indicate that an access point is sending an access-point power-save schedule advertisement and, thus, that no response is needed from a recipient electronic device; '1' to indicate that an access point is sending an access-point power-save schedule request to a recipient electronic device and, thus, is expecting a recipient electronic device to send an access-point power-save response frame; '2' to indicate that a recipient electronic device is sending an access-point power-save response frame in response to a previously received access-point power-save request or set-up frame' and/or another reserved value.

In the preceding embodiments, note that the formats of packets or frames communicated during the communication techniques may include more or fewer bits and/or fields. Alternatively or additionally, the position of information in these packets or frames may be changed. Thus, the order of the fields may be changed.

In some embodiments, a recipient electronic device may provide suggested or recommended access-point power-save mode parameters in a power-save set-up frame. For example, the suggested or recommended access-point power-save mode parameters may include: a start time, a temporal slot duration, a time interval or period, and/or another parameter. In summary, the communication techniques may define an explicit access-point power-save mode in a general IEEE 802.11 specification. The access-point power-save modes can be unicast, multicast or broadcast, i.e., specific to a particular recipient electronic device or to groups of recipient electronic devices (such as some or all of the recipient electronic devices). Moreover, the access-point power-save schedule can be semi-static or dynamic. The access-point power-save schedule may be defined in an access-point power-save information element, which can be included in a unicast access-point power-save frame or a broadcast frame (such as a beacon). Furthermore, the access-point power-save set-up frame may include a persistency value that indicates for how long an access-point power-save schedule is valid. For individual access-point power-save mode setup, negotiation signaling (such as an access-point power-save request, an access-point power-save response, and/or an access-point power-save advertisement) may be used. Additionally, an access point and a recipient electronic device may have the ability to indicate that they provide or support an access-point power-save mode. Based at least in part on the available support, an access point may set up an access-point power-save (such as whether the access point and/or one or more recipient electronic devices supports an access-point power-save mode). Note that a recipient electronic device may not transmit to an access point during access-point power-save slots.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 12 presents a block diagram of an electronic device 1200 (which may be a cellular telephone, an access point, another electronic device, etc.) in accordance with some embodiments. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, application-specific integrated circuits (ASICs), microcontrollers, programmable-logic devices, one or more graphics processing units (GPUs), and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: one or more program modules or sets of instructions (such as program instructions 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Figure 12:
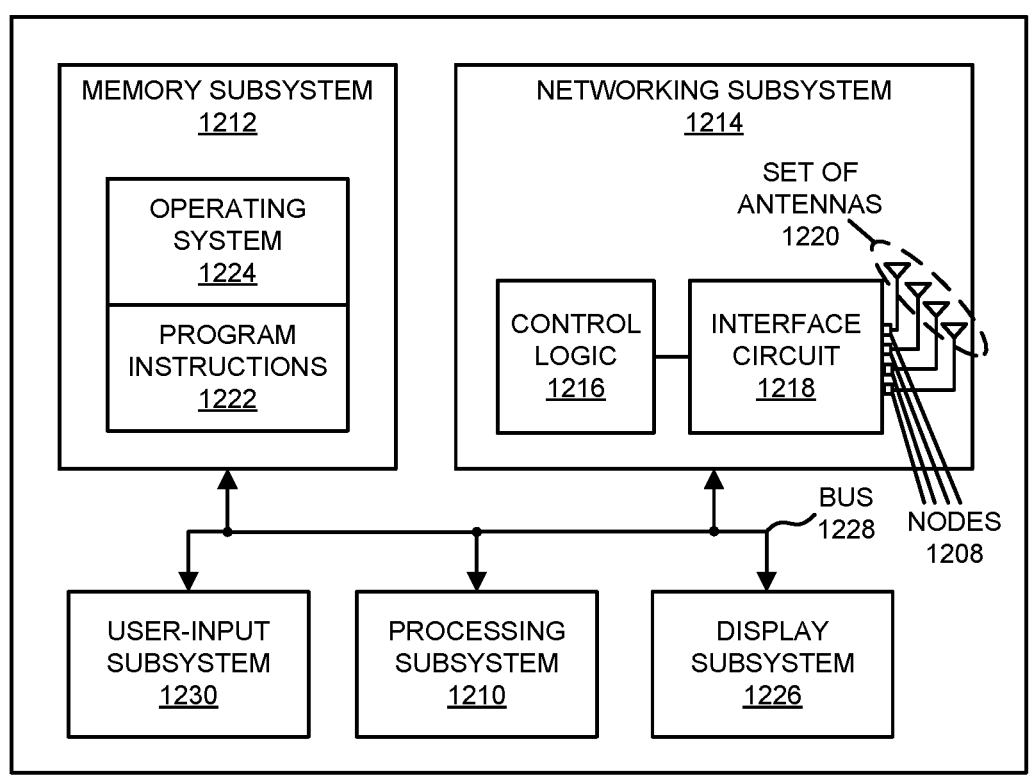
FIG. 12 is a block diagram illustrating an example of one of the electronic devices of FIG. 1.

Networking subsystem 1214 includes one or more devices configured to couple to and communicate on a wired and/or wireless network (i.e., to perform network operations), including: control logic 1216, an interface circuit 1218 and a set of antennas 1220 (or antenna elements) in an adaptive array that can be selectively turned on and/or off by control logic 1216 to create a variety of optional antenna patterns or 'beam patterns.' (While FIG. 12 includes set of antennas 1220, in some embodiments electronic device 1200 includes one or more nodes, such as nodes 1208, e.g., a pad, which can be coupled to set of antennas 1220. Thus, electronic device 1200 may or may not include set of antennas 1220.) For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1214 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices.

Within electronic device 1200, processing subsystem 1210, memory subsystem 1212, and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1222, operating system 1224 (such as a driver for interface circuit 1218) or in firmware in interface circuit 1218. Alternatively or additionally, at least some of the operations in the communication techniques may be implemented in a physical layer, such as hardware in interface circuit 1218. In some embodiments, the communication techniques are implemented, at least in part, in a MAC layer and/or in a physical layer in interface circuit 1218.

While examples of numerical values are provided in the preceding discussion, in other embodiments different numerical values are used. Consequently, the numerical values provided are not intended to be limiting.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated in the same or a different band of frequencies that the band(s) of frequencies used by the main or primary radio. For example, the communication may use one or more bands of frequencies, including: 900 MHz, 2.4 GHz, 5 GHz, 6 GHz, 60 GHz, a Citizens Broadband Radio Service (CBRS) frequency band, a band of frequencies used by LTE, etc.

While the preceding embodiments illustrate embodiments of the communication techniques using temporal slots, in other embodiments the communication techniques may involve the concurrent use of different frequency bands for different operating modes, and/or or a combination of different frequency bands and temporal slots.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a node configured to communicatively couple to an antenna; and
   an interface circuit, communicatively coupled to the node, configured to communicate with a recipient electronic device, wherein the interface circuit is configured to:
      provide, to the node, a management frame, intended for at least the recipient electronic device, that comprises slotted-operation information corresponding to one or more power-save modes of the electronic device in a sequence of temporal slots to be used for communication with at least the recipient electronic device, wherein the slotted-operation information comprises the sequence of temporal slots and associated channel information for the temporal slots.

2. The electronic device of claim 1, wherein the sequence of temporal slots comprises multiple temporal slots and has a slot period.

3. The electronic device of claim 1, wherein the management frame comprises a duration of the temporal slots.

4. The electronic device of claim 1, wherein the management frame is compatible with an Institute of Electrical and Electronics Engineers (IEEE) 802.11 communication protocol; and
   wherein the channel information comprises operating classes and channels in the operating classes.

5. The electronic device of claim 4, wherein, when a channel for a temporal slot comprises a first value, the power-save mode comprises transitioning the electronic device into a lower-power-consumption mode during the temporal slot.

6. The electronic device of claim 4, wherein, when a channel for a temporal slot is different than a first value, the power-save mode comprises performing another activity than communicating with the recipient electronic device during the temporal slot.

7. The electronic device of claim 1, wherein the management frame comprises one or more of: a beacon, a probe-response frame, or an association-response frame.

8. The electronic device of claim 1, wherein the management frame specifies a number of beacon intervals or a time duration over which the sequence of temporal slots and the associated channel information is valid.

9. The electronic device of claim 1, wherein the management frame is associated with a band of frequencies; and
wherein the management frame comprises slotted-operation information for the band of frequencies and a second band of frequencies.

10. The electronic device of claim 1, wherein the management frame comprises synchronization information associated with the electronic device and a synchronization rank of the electronic device that indicates whether to adopt the synchronization information.

11. The electronic device of claim 1, wherein the slotted-operation information for temporal slots associated with the recipient electronic device is different in different bands of frequencies.

12. The electronic device of claim 1, wherein the interface circuit is configured to receive, at the node, recommended slotted-operation information associated with the recipient electronic device;
wherein the recommended slotted-operation information comprises at least one of: a recommended sequence of temporal slots for the recipient electronic device, or recommended channel information for one or more temporal slots for the recipient electronic device; and
wherein the slotted-operation information is based at least in part on the recommended slotted-operation information.

13. The electronic device of claim 1, wherein the management frame is compatible with an Institute of Electrical and Electronics Engineers (IEEE) 802.11 communication protocol.

14. The electronic device of claim 1, wherein the electronic device comprises one of: an infrastructure access point, or a software access point.

15. A method for providing a management frame, comprising:
by an electronic device:
providing the management frame, intended for at least the recipient electronic device, that comprises slotted-operation information corresponding to one or more power-save modes of the electronic device in a sequence of temporal slots to be used for communication with at least the recipient electronic device, wherein the slotted-operation information comprises the sequence of temporal slots and associated channel information for the temporal slots.

16. The method of claim 15, wherein the sequence of temporal slots comprises multiple temporal slots and has a slot period.

17. The method of claim 15, wherein, when a channel for a temporal slot comprises a first value, the power-save mode comprises transitioning the electronic device into a lower-power-consumption mode during the temporal slot; and
wherein, when a channel for a temporal slot is different than the first value, the power-save mode comprises performing another activity than communicating with the recipient electronic device during the temporal slot.

18. A recipient electronic device, comprising:
a node configured to communicatively couple to an antenna; and
an interface circuit, communicatively coupled to the node, configured to communicate with an electronic device, wherein the interface circuit is configured to:
receive, from the node, a management frame, associated with the electronic device, that comprises slotted-operation information corresponding to one or more power-save modes of the electronic device in a sequence of temporal slots to be used for communication with at least the recipient electronic device, wherein the slotted-operation information comprises the sequence of temporal slots and associated channel information for the temporal slots.

19. The recipient electronic device of claim 18, wherein the sequence of temporal slots comprises multiple temporal slots and has a slot period.

20. The recipient electronic device of claim 18, wherein the interface circuit is configured to provide, from the node, recommended slotted-operation information intended for the electronic device;
wherein the recommended slotted-operation information comprises at least one of: a recommended sequence of temporal slots for the recipient electronic device, or recommended channel information for one or more temporal slots for the recipient electronic device; and
wherein the slotted-operation information is based at least in part on the recommended slotted-operation information.

* * * * *